United States Patent
Kasireddy et al.

(10) Patent No.: US 6,596,252 B2
(45) Date of Patent: Jul. 22, 2003

(54) RECYCLING OF SPENT POT LININGS

(75) Inventors: Vijaya Kasireddy, Windsor (CA); Jean-Luc Bernier, Jonquiére (CA); Frank M. Kimmerle, Jonquiére (CA)

(73) Assignee: Alcan International Limited, Montreal (CA)

( * ) Notice: Subject to any disclaimer, the term of this patent is extended or adjusted under 35 U.S.C. 154(b) by 335 days.

(21) Appl. No.: 09/732,645

(22) Filed: Dec. 8, 2000

(65) Prior Publication Data

US 2002/0114748 A1 Aug. 22, 2002

Related U.S. Application Data

(60) Provisional application No. 60/172,480, filed on Dec. 17, 1999.

(51) Int. Cl.[7] .............................. C01D 1/00; C01B 9/08
(52) U.S. Cl. ........................ 423/489; 423/184; 423/208; 423/122; 423/131; 423/132; 423/490
(58) Field of Search .................. 423/111, 122, 423/131, 184, 185, 208, 489, 490, 132

(56) References Cited

U.S. PATENT DOCUMENTS

| | | | |
|---|---|---|---|
| 3,808,322 A | | 4/1974 | Lam et al. .................. 423/185 |
| 4,113,831 A | * | 9/1978 | Orth et al. .................. 423/119 |
| 4,113,832 A | | 9/1978 | Bell et al. .................. 423/119 |
| 4,444,740 A | * | 4/1984 | Snodgrass et al. .......... 423/483 |
| 4,508,689 A | * | 4/1985 | Bush et al. .............. 423/574.1 |
| 4,816,122 A | | 3/1989 | Lever ...................... 204/182.4 |
| 4,889,695 A | * | 12/1989 | Bush .......................... 423/132 |
| 5,470,559 A | | 11/1995 | Grolman et al. ............ 423/489 |

* cited by examiner

Primary Examiner—Ngoc-Yen Nguyen
(74) Attorney, Agent, or Firm—Cooper & Dunham LLP

(57) ABSTRACT

A process is described for the treatment of spent pot lining material from electrolyte reduction cells, this spent material having a substantial content of cryolite. The spent material is first leached with water at a dilution and a time sufficient to dissolve substantially all water soluble fluorides, after which the solid residue is separated from the liquid. The solid residue obtained is then subjected to a caustic leach with an aqueous sodium hydroxide solution containing about 20 to 50 g/L of NaOH and thereafter the solid residue is separated from the liquid.

7 Claims, 3 Drawing Sheets

RECYCLING OF SPENT POT LININGS

CROSS-REFERENCE TO RELATED APPLICATION

This application claims the priority benefit under 35 U.S.C. §119(e) of now abandoned U.S. provisional patent application No. 60/172,480 filed Dec. 17, 1999.

BACKGROUND OF THE INVENTION

1. Field of the Invention

This invention relates to the treatment of used linings of aluminum reduction cells, commonly referred to as spent pot linings. More particularly, the invention relates to the treatment of linings of this type to permit safe disposal of the linings.

2. Description of the Prior Art

Aluminum is normally produced by dissolving alumina at high temperature (about 900° C.) in molten cryolite ($Na_3AlF_6$) in electrolytic cells, or pots, provided with electrically conductive carbon linings, and electrolyzing the molten solution by passing an electric current between carbon anodes dipping into the melt and the carbon linings acting as cathodes. Cells of this type may be used for considerable periods of time, e.g. up to ten years, and during this time the carbon lining material absorbs sodium fluoride and other contaminants. At the end of the operational lifetime of the cells, the linings are removed and broken up and have to be disposed of in some way. However, the spent lining material, which is composed of carbon, refractory material from insulating refractory bricks and cryolite, including fluorine, aluminum, sodium, calcium and silicon values, along with free and complexed cyanides, carbides and nitrides, is hazardous and must be treated with great caution.

The electrolytic cells for producing aluminum are typically of two types. The first is a pre-bake type, where the carbon-based anodes are first formed and then are baked under high temperature to maintain their shape without support in the cell. The second is the Soderberg cell where the anode material is semi-fluid and requires an open-ended box-like container to hold it in place.

The safe disposal of spent linings has for a long time presented a challenge to the industry. That challenge continues with ever stricter environmental standards. Thus, disposal residues are limited to very low concentrations of fluorides and cyanides, e.g. TCLP (Toxicity Characteristic Leaching Procedure) leachable fluorides of less than 49 mg/l and reactive cyanides of less than 250 mg/kg as HCN.

Previous researchers have come up with a variety of possible methods for treating spent pot linings. For example, Bell et al. in U.S. Pat. No. 4,113,832 describe a process for treating spent pot lining in which the crushed material is first subjected to a high temperature pyrohydrolysis treatment in the presence of water at 1,150 to 1,250° C. The NaF and HF off-gases in vapour form are obtained and are recovered. The solid residue is immersed in a dilute caustic solution at greater than 200° C. to leach out the alumina for later reuse. This process requires very large and expensive reactors and their high capital and operating costs make them uneconomical to operate.

In Lever, U.S. Pat. No. 4,816,122 a process for treating spent pot lining material is described in which the spent material is treated with caustic solutions of either high or low concentration. In the high concentration option, the waste material is first leached in a 200–400 g/l caustic solution at less than 100° C., followed by leaching in water at less than 100° C. It has been found that this process traps too much fluoride in the residue such that it is not capable of meeting government environmental requirements.

Snodgrass et al. U.S. Pat. No. 4,444,740 describes a process for treating spent pot linings in which crushed pot lining material is first incinerated to destroy the cyanides. The resulting ash is then leached with water or dilute caustic at 20–120° C. to recover the fluoride values. Incineration is an expensive procedure for this purpose.

Another patent which uses calcination to destroy the cyanides is described in Lam et al U.S. Pat. No. 3,808,322. In that case, the calcined material is subjected to a water leaching step at 50–100° to recover the fluorine values.

A more recent patent also relating to the treatment of spent pot linings is Grolman et al. U.S. Pat. No. 5,470,559. In that process, the spent pot lining material is first treated with an aqueous sodium hydroxide solution. Thereafter, the solution obtained is heat treated to destroy cyanide values and water is evaporated in the resulting solution to cause fluoride compounds in the solution to precipitate. The fluoride crystals are then separated from the solution.

It is an object of the present invention to provide an improved leaching process for removing the environmentally harmful materials, such as fluorides and cyanides, from the spent pot linings and render the residue safe for landfill as a non-hazardous bi-product, or further recuperation of chemical values.

SUMMARY OF THE INVENTION

The present invention provides a process for treating spent pot lining material contaminated with fluoride and cyanide values. The spent pot lining material is first leached with water at a dilution and time sufficient to dissolve substantially all water soluble compounds including fluorides in the spent material. The solution is then removed from the solid residue and this residue is then subjected to a caustic leach with an aqueous sodium hydroxide solution containing about 20 to 50 g/L of sodium hydroxide. Thereafter, the solid residue is separated from the liquid.

The first stage water leaching is preferably carried out at a dilution ratio of spent material:water in the range of 1:3 to 1:8, more preferably 1:3 to 1:4. The water leaching is typically carried out at a temperature in the range of about 20 to 70° C. for a period of about 10 to 20 minutes.

The second stage caustic leaching is preferably carried out at a dilution ratio of spent material:water in the range of about 1:4 to 1:12, with the ratio of 1:6 being particularly preferred. Caustic concentrations in the range of about 30 to 40 g/L are also particularly preferred.

It is quite surprising that the caustic leaching process is greatly improved by preceding this with an initial water leaching stage. By initially removing all soluble fluorides, the level of caustic in the second stage caustic leaching need only be sufficient to attack and break down the cryolite (sodium aluminum fluoride compounds) so that the remaining soluble fluoride is released, but at a level not so high as to depress the solubility of that fluoride. It has been found that with the process of this invention, the total combined water/caustic leachate volume is 20% smaller than if just caustic by itself was used for leaching. This results in the size of the cyanide reactor and evaporator/crystallizer units being reduced and translates into lower cost for the process as a whole.

It has been found that for certain types of pre-bake electrolysis cells, an additional water leaching step may be necessary following the caustic leaching to remove all of the fluoride. For the Soderberg cells, in which the residue contains lithium, both an acid activation step and a further caustic leaching step may be necessary to overcome the protective effect of lithium on the soluble fluoride. When an acid activation step is used, it is typically at a pH of about 7 to 10, preferably 8 to 9.

DESCRIPTION OF THE PREFERRED EMBODIMENTS

As a first step, the material removed from the aluminum reduction cell is crushed and/or ground to a small particle size of about −65 to −28, preferably −48 Tyler mesh.

Figure 1:
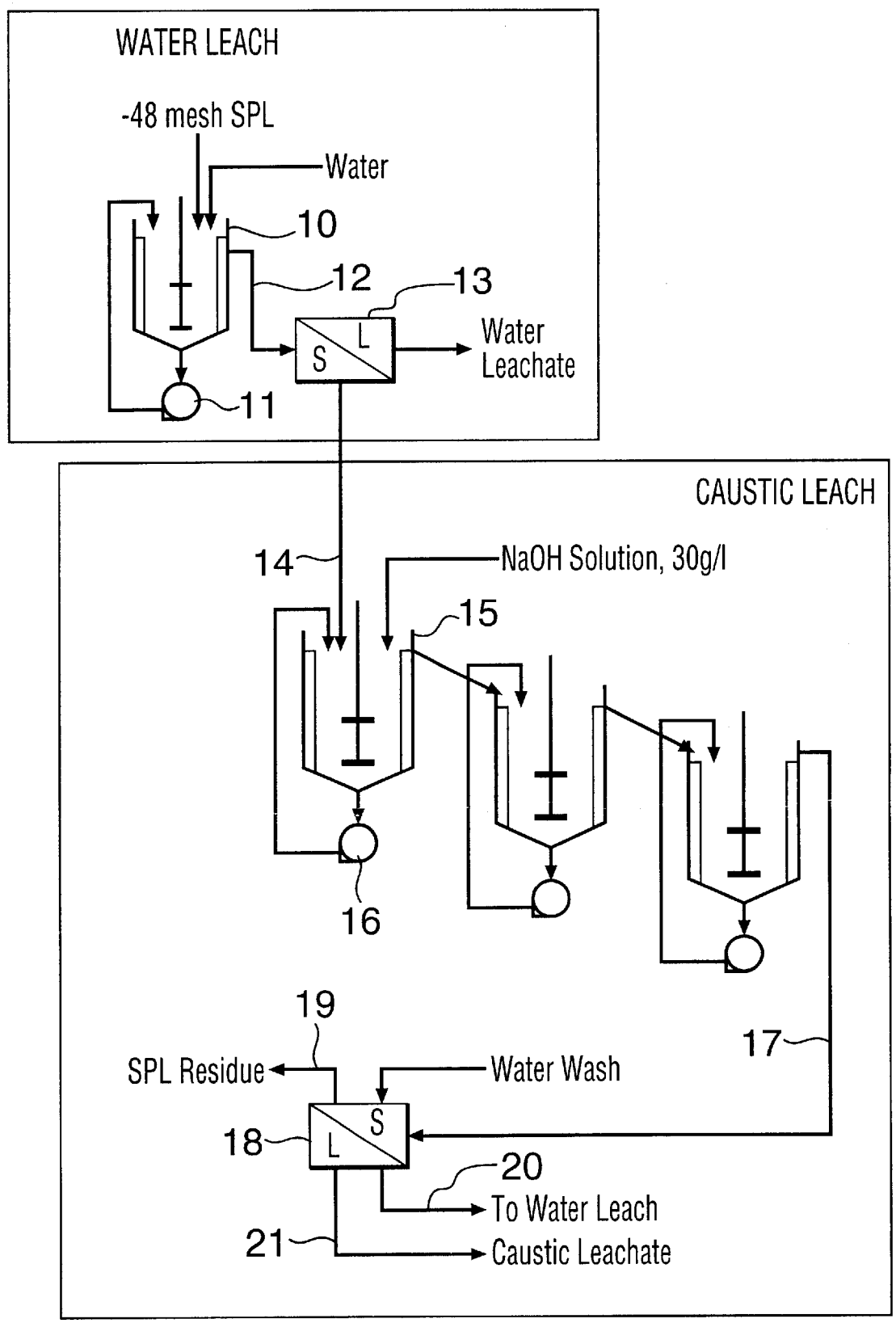
FIG. 1 is a schematic flow diagram illustrating the basic two-stage process of the invention.

As shown in FIG. 1, the crushed pot lining is treated with water preferably at a dilution ratio of spent material:water in the range of about 1:3 to 1:8 and at a temperature of about 20 to 70° C. for a period of about 10 to 20 minutes. This solubilizes the fluoride-containing values and yields a solution containing dissolved fluoride, lithium and sodium compounds.

Leaching is typically performed in baffled, stirred tanks 10 equipped with high intensity agitation. Each reactor is equipped with a high shear mixing pump 11 which recirculates the bottoms from each tank onto the top of the reactor.

A slurry 12 is obtained from the first water leaching step and this is filtered in filter 13. The wet cake 14 obtained from the filter 13 is then fed to a caustic leaching stage comprising cascade reactors 15, each having a high shear mixing pump 16. In this caustic leaching stage, the wet cake is leached with 20 to 50 g/L NaOH at 60 to 95° C. for a period of 40 to 80 minutes. Following this leaching stage, the slurry 17 is passed to a filter 18 where the wet cake is washed twice with the water at 20 to 60° C.

The dilution ratio of the spent pot line material to leachate in the first water leach is between 1:3 and 1:8 and the second caustic leach is between 1:4 and 1:12. The dilution rate depends on the water soluble and caustic soluble fluorides present in the spent pot lining material, to give a fluoride concentration of about 10 g/L as fluoride ions in the leachate. The dilution ratio in the first wash is 1:1 and in the second wash is 1:2. All dilutions are based on the initial weight of spent pot lining material. The water leach filtrate, caustic leach filtrate and the first water wash are mixed together or sent separately to the next stage (cyanide destruction) of the process. The second water wash is turned back as feedstock for the water leaching stage.

Spent pot lining samples having high soluble fluorides require large dilution ratios to dissolve the fluorides. In a single stage leaching this is a disadvantage. For samples having 20% of more soluble fluorides, the dilution ratio will be about 1:20, giving a solids concentration of less than 5% in the leach reactors. This reduces the attrition and the rubbing action between particle to particle, and with the baffles and walls of the reactor. The two-stage leaching of the present invention increases the solids content in the slurry, thus enhancing the leaching efficiency.

The rate of leaching of fluorides from the spent pot lining material into the leachate is much higher for two-stage leaching than single-stage leaching. The rate of leaching is a direct function of the difference in the concentration of fluorides in the solute to that of saturation. For this reason, the residence time in the first water leach is much shorter than in the second caustic leach. This is a significant economic advantage, as smaller reactors are required for smaller residence times. Also, the preliminary water leach reduces the amount of caustic consumed. The smaller residence time and less caustic results in reduced solubility of silica and re-precipitated silicates. Eventually, this leads to a decline in the fluorides trapped in the desilication product and less sodium in the residue. It was also found that almost all the cyanides in the spent pot lining material were dissolved in the first water leach. Therefore, only the water leach requires a further cyanide destruction step.

Figure 2:
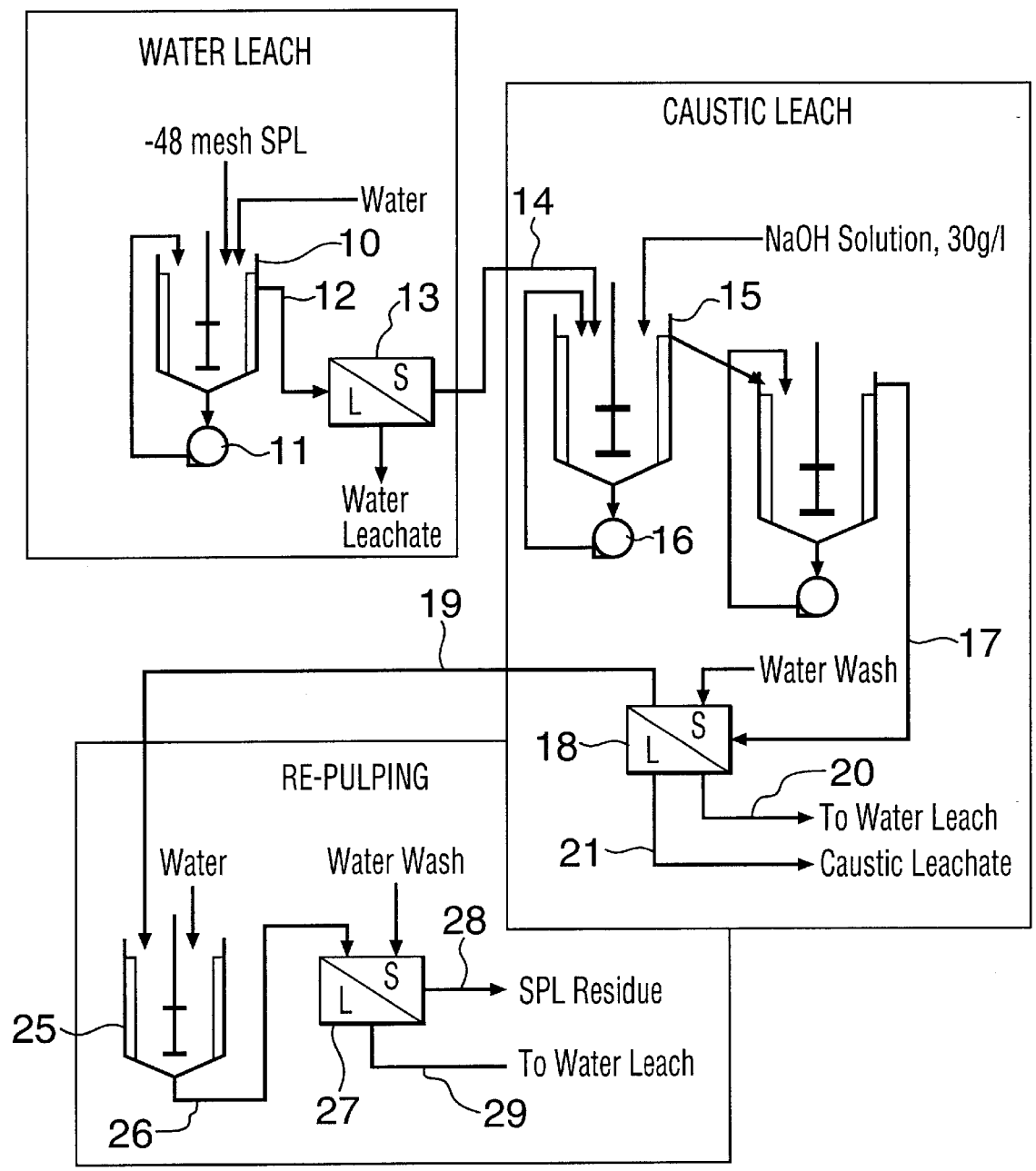
FIG. 2 is a schematic flow diagram illustrating an additional water re-pulping stage.

For some spent pot lining materials that are difficult to leach, the wet cake after the first water wash from the two-stage leaching is subjected to a re-pulping step. This is illustrated in FIG. 2. The water leaching and caustic leaching are carried out in the same manner as described above in relation to FIG. 1, but the spent pot lining material residue 19 from the filter 18 is sent to a re-pulping vessel 25 where the wet cake is re-pulped in water for 10 to 20 minutes at 60° C., at a dilution ratio of 1:2. The slurry 26 is filtered in filter 27 and the wet cake is washed with water. Both the filtrate and wash water 29 are returned as feedstock for the water leach, and the spent pot lining material residue 28 is recovered.

Spent pot lining materials that are difficult to leach contain higher soluble fluorides and silica. During leaching, the soluble silicon re-precipitates as sodium aluminate silicate compounds on the surface of the spent pot lining particles and hinders the solubility of fluorides. These compounds also trap soluble fluorides in caustic in its solid matrix, which eventually report in residue. During re-pulping, the particle attrition is preferably increased with a high solids ratio of 2:1, thus reducing the residual fluorides and alkalinity of the treated spent pot lining material.

For spent pot lining materials originating from Soderberg pots or pot lining high in cryolite, soluble silica and lithium, a chemical activation step may be required to lower the spent pot lining residue to the desired level. This procedure in shown in FIG. 3, from which it will be seen that the wet cake 30 after the first water wash in filter 18 is subjected to acid activation in vessel 31. Dilute $H_2SO_4$ from vessel 32 is used for this purpose and a slurry 33 obtained is filtered in filter 35 and the wet cake 34 obtained is again leached in caustic solution in vessel 36 to dissolve the exposed fluorides. The slurry 37 obtained is then filtered in filter 38 where it is water washed to result in the spent pot line residue 39.

During leaching of this spent pot lining material, there is a continuous reprecipitation of sodium aluminum silicate compounds on the surface of the particles. These compounds tend to block the pores of the spent pot lining particles and stop the solubility of residual fluorides. They also tend to inhibit the reaction of caustic solution with cryolite trapped inside the pores. Accordingly, to assure an efficient leaching, it is important to remove this coating in a continuous manner. The acid activation step has been found to be remove this obstruction without significant process or economic penalty. The subsequent dilute caustic re-pulping is also necessary to react and dissolve the newly exposed residual fluorides from the spent pot lining material. The dilution ratio in both the post treatment operations is typically 1:2 by weight based on the initial spent pot lining material.

EXAMPLE 1

A series of tests were conducted on different samples of spent pot lining using the basic two-stage leaching process of FIG. 1 and the two-stage leaching process with re-pulping of FIG. 2. The tests were run on a continuous basis at a feed rate of 400 g/min. and the re-pulping was done in batch mode. The dilution ratio of spent pot lining material:leachate in the two stages was maintained such that the fluoride concentration in the leach liquor was about 10 g/L. In the first water leach, the dilution ratio varied from 4 to 6 times the spent pot lining weight. The temperature was maintained at 60° C. and the residence time was 20 minutes. The slurry was filtered on a rotary vacuum filter and the wet cake was mixed with high caustic (30 g/L NaOH) and the ratio was varied between 8 to 10 times the spent pot lining weight. The temperature was 90° C. with a residence time of 60 minutes. The second stage was processed in three cascade reactors and filtered using a pressure filter. The filter cake was washed with hot water at 1×dilution. The wet cake when re-pulped was mixed with water at 60° C. for 10 minutes and then filtered. The dried cake was subjected to a leachable fluoride test. The results obtained are shown in Table 1 below.

TABLE 1

Effect of re-pulping on the leachable fluorides in SPL residue

| SPL Type | Fluoride, % Initial SPL | TCLP Fluorides, mg/L Two Stage Leaching | Two Stage Leaching with Repulping |
|---|---|---|---|
| U-544 | 19.8 | 68 | 31 |
| E-1 | 16.5 | 129 | 24 |
| E-2 | 16.1 | 157 | 42 |
| L-4059 | 17.7 | 180 | 27 |
| L-C65 | 14.7 | 70 | 49 |

Figure 3:
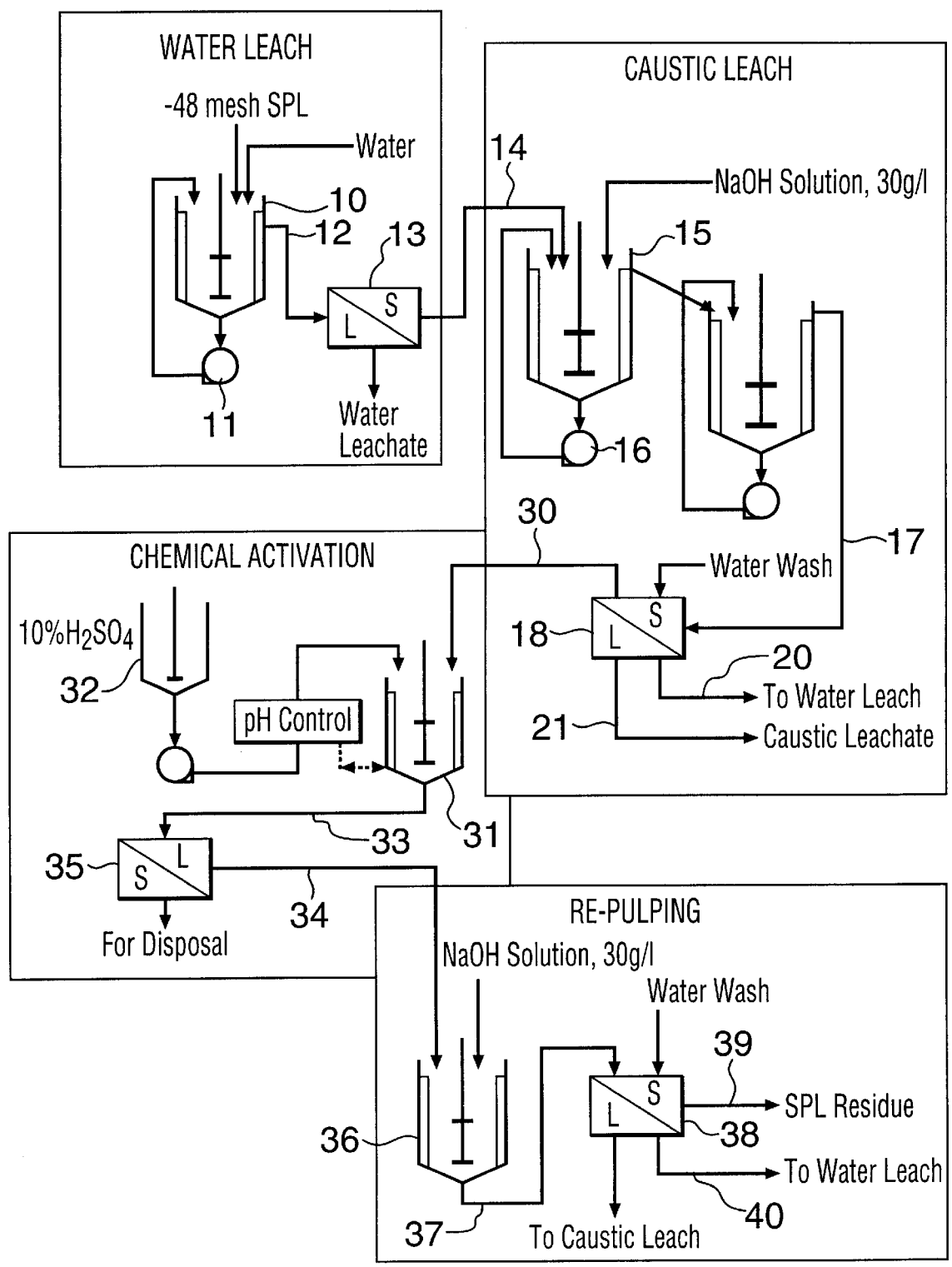
FIG. 3 is a still further schematic flow diagram illustrating both an acid activation stage and a further re-pulping stage.

Further tests were conducted using the chemical activation step as shown in FIG. 3. The conditions for water and caustic leaching were the same as in FIG. 1 and the wet cake from the second stage caustic leach was subjected to chemical activation. Here, the wet cake was mixed with 2 times its weight in water at 90° C. and dilute $H_2SO_4$ (10% concentration) was added slowly using a Masterflex pump connected to a pH controller. The pH was maintained at about 8.0 for a period of 10 to 20 minutes, depending on the type of spent pot lining material. Next this slurry was filtered and the wet cake obtained was subjected to caustic re-pulping in 2×dilution of 30 g/L NaOH solution at 90° C. for 10 minutes. The slurry was filtered and washed with hot water. The wet cake was then dried and analyzed for leachable fluorides and reactive cyanides. The results obtained are shown in Table 2 below.

TABLE 2

Effect of chemical activation on the leachable fluorides in SPL residue

| | | TCLP Fluorides, mg/L | | |
|---|---|---|---|---|
| SPL Type Source | Flouride, % Initial SPL | Two Stage Leaching | Two Stage Leaching with Repulping | Two Stage Leaching with Acid Activation |
| L-C65 | 16.7 | 472 | 413 | 51 |
| L-C106 | 16.5 | 485 | 358 | 59 |
| S-C15 | 16.1 | 211 | 289 | 22 |
| I-C23 | 17.5 | 316 | 230 | 48 |
| C-3E | 19.9 | 190 | 54 | 27 |
| B-651 | 17.9 | — | 134 | 18 |

The elemental composition of the filtrates and wash water during the two stage leaching with chemical activation was also determined. The results obtained are shown in Table 3 below.

TABLE 3

Composition of various liquid streams during two stage leaching, chemical activation and acid re-pulping on SLP type L51-C65.

| | Liquid Stream & Dilution Ratio | | | | | |
|---|---|---|---|---|---|---|
| Component mg/L | Water Leach 6× | Caustic Leach 10× | Water Wash 1× | Acid Activation 2× | Caustic Re-pulping 2× | Water Wash 1× |
| Fluoride | 8771 | 12035 | 2720 | 586 | 1559 | 461 |
| Sodium | 13777 | 28808 | 5550 | 1478 | 29417 | 7007 |
| Aluminum | 1252 | 4382 | 718 | 40 | 560 | 130 |
| Silicon | 161 | 319 | 122 | 32 | 1390 | 396 |
| Lithium | 149 | 139 | 104 | 559 | 430 | 431 |
| Calcium | 9.2 | 4.4 | 6.5 | 5.6 | 3.7 | 2.7 |

The above table gives the ionic composition of the important elements that are solubilized from the spent pot lining into the solution. The dilution ratios are based on the initial weight of spent pot lining material. It will be seen that there is a significant increase in the lithium and silicon ions in the solution after acid activation. This shows that the silicon and lithium compounds were destabilized during acid activation. More than 2% fluoride is extracted from the spent pot lining because of acid activation.

EXAMPLE 2

As a further exemplification of the alternative methods described above, leaching tests based on FIG. 1, 2 or 3 were carried out on spent pot lining materials from various sources. The results are shown in Table 4 below.

TABLE 4

CRM Pilot scale tests: Best results obtained for treating SPL.

| | | TCLP leachable F mg/L | |
|---|---|---|---|
| Sample | F Content | | Comments |
| U-544 | 19.8% | 31 | Repulping in water |
| U-652 | 18.8% | 27 | Acid activation |
| L-4059 | 16.0% | 27 | Repulping in water |
| L-1037 | 15.9% | 33 | Repulping in water |
| E-1 | 16.5% | 24 | Repulping in water |
| E-2 | 16.% | 42 | Repulping in water |
| C40–C65 | 14.7% | 49 | Repulping in water |
| C-52–C106 | 19.9% | 59 | Acid activation |
| C-L51-C65 | 16.7% | 51/36 | Acid activation |
| C-L50-C82 | 19.0% | 75 | Acid activation |
| S-C15 | 23.8% | 22 | Acid activation |
| I-C23 | 17.5% | 48 | Acid activation |
| U-2500 | 20.9% | 29 | Repulping in water |
| L-1325 | 7.5% | 23 | Two stage leaching only |
| L 1050 | 20.5% | 24 | Repulping in water |
| B-651 | 17.9% | 18 | Acid activation |
| C-3E | 19.9% | 23 | Acid activation |

The type of leaching required to obtain the best results is shown in the "Comments" column. Thus it will be seen that because of its low fluoride content, spent pot lining L-1325 gave good results with only two stage leaching. For spent pot lining from pre-baked pots, re-pulping in water was necessary to obtain satisfactory results. For spent pot lining from Soderberg pots, acid activation was necessary.

EXAMPLE 3

Tests were conducted to determine operable dilution ratios for the two-stage leaching process.

In an initial test, the water Teachings were conducted at different dilution ratios, while the caustic leaching was conducted at a fixed ratio. The spent pot lining was −48 Mesh carbon+brick (72:28) and the Teachings were carried out in a parr bomb reactor at 90° C. and 1 atm for 1 hour. For the caustic leaching, 40 g/l NaOH was used.

The water Teachings were conducted at dilutions ratios of 5×, 6×, and 7×, while the caustic leaching was conducted at a single dilution ratio of 2.3×. The results indicated that at water dilution ratios above 5×, the fluoride concentration decreased. All the soluble sodium was recovered in the water leaching along with about ⅔ of the total fluoride.

Based on the above results, further tests were conducted similar to the above, using a single water dilution ratio of 5× and varied caustic dilution ratios of 3.9×, 5.2× and 6.5×. The caustic was 30 g/l NaOH solution. A single stage leaching was also conducted at a 10×dilution ratio with 30 g/l NaOH caustic solution.

The results and analysis of the test run is given in Table 5 for the first water leach and in Table 6 for the second caustic leach.

TABLE 5

| 1st water leach | 5X Dil. |
| --- | --- |
| SLP weight initial, g | 400 |
| Residue wt (dry), g | 305 |
| % Wt loss in 1st leach | 23.75 |
| Filtrate Volume, ml | 1760 |
| Wash Water, ml | 385 |
| Analysis Filtrate, g/l | |
| Fluoride | 13.72 |
| Sodium | 23.31 |
| Aluminium | 3.64 |
| Silicon | 0.352 |
| Analysis Wash Water, g/l | |
| Fluoride | 7.63 |
| Silicon | 0.158 |
| Lithium | 0.059 |
| Sodium | 10.86 |
| Aluminium | 1.383 |
| Analysis Residue, % | |
| Fluoride | 6.71 |
| Sodium | 6.99 |
| Silicon | 9.83 |
| Lithium | 0.27 |
| Values Recuperated/100 g SPL | |
| Fluoride, g | 6.77 |
| Lithium, g | 0.077 |
| Sodium, g | 11.30 |
| Silicon, g | 0.170 |
| Total Volume (filtrate), ml | 536.3 |
| Fluoride, g/l | 12.63 |
| Silicon, g/l | 0.317 |

TABLE 6

| 2nd Caustic Leach (30 g/l NaOH | | | | Single Leach |
| --- | --- | --- | --- | --- |
| Leachate/SPL Ratio | 3.9X | 5.2X | 6.5X | 10X |
| SPL (from 1st Leach, g | 77 | 77 | 77 | 150 |
| Leachate volume, ml | 300 | 400 | 500 | 1500 |
| Residue, wt(dry), g | 70.49 | 70.97 | 70.64 | 106 |
| % Wt loss in 2nd leach | 8.45 | 7.83 | 8.26 | 29.33 |
| Filtrate Volume, ml | 254 | 365 | 455 | 1357 |
| Wash Water, ml | 199 | 198 | 200 | 150 |
| Analysis Filtrate, g/l | | | | |
| Fluoride | 9.03 | 6.88 | 5.58 | 9.48 |
| Sodium | 22.28 | 20.94 | 20.13 | 29.81 |
| Aluminim | 2.43 | 1.84 | 1.57 | 2.74 |
| Silicon | 0.265 | 0.306 | 0.323 | 0.398 |
| Lithium | 0.175 | 0.17 | 0.16 | 0.116 |
| Analysis Wash Water, g/l | | | | |
| Fluoride | 1.88 | 1.45 | 1.23 | 7.63 |
| Silicon | 0.081 | 0.081 | 0.078 | 0.158 |
| Lithium | 0.061 | 0.058 | 0.051 | 0.059 |
| Sodium | 5.02. | 4.29 | 4.18 | 10.86 |
| Aluminium | 0.5. | 0.43 | 0.3 | 1.383 |
| Analysis Residue, % | | | | |
| Fluoride | 3.22 | 2.62 | 2.72 | 2.11 |
| Sodium | 5.02 | 5.35 | 5.31 | 6.53 |
| Aluminium | 8.73 | 9.03 | 8.97 | 8.36 |
| Silicon | 10.48 | 10.74 | 10.63 | 10.06 |
| Lithium | 0.22 | 0.21 | 0.2 | 0.25 |
| Calcium | 4.19 | 4 | 4.14 | 3.92 |
| Values Recuperated/100 g SPL | | | | |
| Fluoride, g | 3.46 | 3.63 | 3.62 | 9.34 |
| Lithium, g | 0.073 | 0.095 | 0.108 | 0.111 |
| Sodium, g | −3.04 | −4.56 | −6.50 | −1.95 |
| Aluminium, g | 0.93 | 0.96 | 1.01 | 2.62 |
| Silicon, g | 0.108 | 0.166 | 0.211 | 0.376 |
| Total Values Recuperated in 1st and 2nd Leaches/100 g SPL | | | | |
| Fluoride, g | 9.41 | 9.54 | 9.53 | 9.34 |
| Lithium, g | 0.133 | 0.150 | 0.160 | 0.111 |
| Sodium, g | 8.98 | 7.83 | 6.35 | −1.95 |
| Aluminium, g | 2.44 | 2.48 | 2.50 | 2.62 |
| Silicon, g | 0.253 | 0.297 | 0.331 | 0.376 |
| Total Volumes and Concentrations for 1st Leach/100 g SPL | | | | |
| Total volume (no wash vol.), ml | 251.5 | 361.4 | 450.6 | 1004.7 |
| Fluoride, g/l | 9.03 | 6.88 | 5.58 | 9.30 |
| Silicon, g/l | 0.265 | 0.306 | 0.323 | 0.374 |
| Total Volumes and Concentrations for 1st and 2nd Leaches/100 g SPL | | | | |
| Total volume, ml | 787.8 | 897.7 | 986.8 | 1004.7 |
| Fluoride, g/l | 11.48 | 10.31 | 9.41 | 9.30 |
| Silicon, g/l | 0.301 | 0.313 | 0.320 | 0.374 |
| % Increase or Decrease of Values,when Compared to Single Leach | | | | |
| Fluoride | 0.79 | 2.17 | 2.03 | Increase |
| Lithium | 20.39 | 35.52 | 43.98 | Increase |
| Silicon | −32.77 | −21.09 | −11.92 | Decrease |
| Volume | −21.59 | −10.65 | −1.78 | Decrease |

It was found that in the second stage caustic leaching, the fluoride concentration decreased with increasing dilution ratio from 9 g/l to 5.6 g/l. The dissolved silica concentration increased from 0.26 g/l to 0.32 g/l, with increase in the dilution ratio. These values were considerably lower than the 0.4 g/l obtained in a single leach.

It can be seen that in the two stage leaching, the extraction of fluorides and lithium has been increased, while the total silica dissolved has decreased, when compared to single stage leaching. The overall improvement was found to be a function of the dilution ratios employed.

What is claimed is:

1. A process for the treatment of spent pot lining material from electrolyte reduction cells, said spent material having a substantial content of cryolite, which comprises (a) leaching said spent material with water at a dilution and a time sufficient to dissolve substantially all water soluble fluorides, thereafter separating the solid residue from the liquid and (b) further subjecting the solid residue obtained to a caustic leach with an aqueous sodium hydroxide solution containing about 20 to 50 g/L of NaOH and thereafter separating the solid residue from the liquid.

2. A process according to claim 1 wherein the water leaching is carried out at a dilution ratio of spent material: water in the range of about 1:3 to 1:8.

3. A process according to claim 2 wherein the water leaching is carried out at a temperature of about 20 to 70° C. for a period of about 10 to 20 minutes.

4. A process according to claim 2 wherein the caustic leaching is carried out at a dilution ratio of solid residue: water in the range of about 1:4 to 1:12.

5. A process according to claim 1 wherein the solid residue from the caustic leach is further leached (re-pulped) with water to further remove fluorides.

6. A process according to claim 1 wherein the solid residue from the caustic leach is treated with a dilute aqueous acid solution and thereafter the separate solid residue is further leached with an aqueous sodium hydroxide solution.

7. A process according to claim 6 wherein the acid treatment is carried out at a pH of about 7 to 10.

* * * * *